(12) United States Patent
Han

(10) Patent No.: US 11,828,420 B2
(45) Date of Patent: Nov. 28, 2023

(54) DEVICE FOR CONTROLLING CHARGING OF HYDROGEN TANK FOR VEHICLE

(71) Applicants: Hyundai MotorCompany, Seoul (KR); Kia Corporation, Seoul (KR)

(72) Inventor: Wook Hyun Han, Seoul (KR)

(73) Assignees: Hyundai MotorCompany, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/865,684

(22) Filed: Jul. 15, 2022

(65) Prior Publication Data
US 2023/0024414 A1 Jan. 26, 2023

(30) Foreign Application Priority Data
Jul. 21, 2021 (KR) .................. 10-2021-0095925

(51) Int. Cl.
*F17C 5/06* (2006.01)
*F17C 13/02* (2006.01)

(52) U.S. Cl.
CPC .............. *F17C 5/06* (2013.01); *F17C 13/028* (2013.01); *F17C 2221/012* (2013.01); *F17C 2250/032* (2013.01); *F17C 2250/0426* (2013.01); *F17C 2270/0139* (2013.01)

(58) Field of Classification Search
CPC .... F17C 5/06; F17C 13/028; F17C 2221/012; F17C 2250/032; F17C 2250/0426; F17C 2270/0139; F17C 2205/0326; F17C 2227/04; F17C 2260/02; F17C 2265/065; F17C 2250/0636; F17C 2250/0689; Y02E 60/32; B60K 15/03006; B60K 2015/03256; B60K 2015/03315; B60K 2015/0319; B60K 2015/03026; B60K 2015/0321
USPC ........................................................ 141/223
See application file for complete search history.

(56) References Cited

U.S. PATENT DOCUMENTS

| | | | | |
|---|---|---|---|---|
| 8,534,327 B2* | 9/2013 | Inagi | .......... | F17C 5/06 141/83 |
| 8,752,596 B2* | 6/2014 | Mori | ...... | F17C 3/025 62/53.2 |
| 10,935,186 B2* | 3/2021 | Araki | ....... | F17C 5/007 |
| 2002/0014277 A1* | 2/2002 | Togasawa | ......... | F17C 5/06 141/1 |
| 2012/0205003 A1* | 8/2012 | Okawachi, I | ......... | F17C 5/00 141/95 |
| 2012/0291902 A1* | 11/2012 | Mori | ...... | F17C 5/06 138/40 |
| 2015/0362383 A1* | 12/2015 | Komiya | ......... | F17C 13/025 702/99 |
| 2015/0377416 A1* | 12/2015 | Miyoshi | ........ | F17C 13/025 141/95 |
| 2016/0017823 A1* | 1/2016 | Sloan | ........ | B60K 15/03006 123/457 |

* cited by examiner

*Primary Examiner* — Timothy P. Kelly
*Assistant Examiner* — Stephanie A Shrieves
(74) *Attorney, Agent, or Firm* — MORGAN, LEWIS & BOCKIUS LLP

(57) ABSTRACT

A device for controlling a charging of a hydrogen tank for a vehicle, may efficiently perform a charging of a hydrogen tank regardless of a hydrogen charging protocol for each charging station configured to supply hydrogen to the hydrogen tank by directly controlling a hydrogen charging speed of the hydrogen tank in a vehicle upon charging the hydrogen tank mounted in the vehicle.

20 Claims, 4 Drawing Sheets

DEVICE FOR CONTROLLING CHARGING OF HYDROGEN TANK FOR VEHICLE

CROSS-REFERENCE TO RELATED APPLICATION

The present application claims priority to Korean Patent Application No. 10-2021-0095925 filed on Jul. 21, 2021, the entire contents of which is incorporated herein for all purposes by this reference.

BACKGROUND OF THE INVENTION

Field of the Invention

The present invention relates to a device for controlling a charging of a hydrogen tank for a vehicle, and specifically, to a device for controlling a charging of a hydrogen tank for a vehicle capable of efficiently charging hydrogen in the hydrogen tank in any charging situation.

Description of Related Art

A hydrogen vehicle is a vehicle using hydrogen as a fuel and is mounted with a hydrogen tank for storing hydrogen. Such a hydrogen vehicle receives the hydrogen stored in a charging station through a charging station dispenser to charge the hydrogen in the hydrogen tank.

Now, a hydrogen supply protocol of the charging station is not defined, and various hydrogen supply methods exist for each charging station. Furthermore, the capacity, pressure, etc. of the hydrogen stored in each charging station are different, and hydrogen supply speeds of the hydrogen supplied to the hydrogen tank for the vehicle through the charging station dispenser are also different. Furthermore, the temperature, pressure, and state of charge of the hydrogen tank for the vehicle vary depending upon a hydrogen supply situation of the charging station.

Therefore, there is a demand for a robust charging control technology capable of efficiently and stably charging hydrogen in the hydrogen tank for the vehicle in response to a hydrogen supply method for each charging station.

Now, the charging station supplies hydrogen to the hydrogen tank in a method for securing charging stability of the hydrogen tank for the vehicle as possible, but if a communication device is not constructed between the vehicle and the charging station, it is impossible to carry out the stable charging capable of responding to the temperature and the pressure of the hydrogen tank for the vehicle that vary depending upon the hydrogen supply situation of the charging station.

Meanwhile, due to the properties of the hydrogen vehicle, it is necessary to satisfy temperature conditions of the hydrogen tank upon charging the hydrogen tank. Hydrogen should be charged in the hydrogen tank in a predetermined range of temperature to prevent explosion and secure the state of charge, and the hydrogen is charged up to the maximum pressure at a predetermined range of the highest temperature or less.

The temperature of the hydrogen tank is changed by various conditions, such as an external air temperature, an initial state of charge, and a hydrogen supply method of the charging station.

Since the hydrogen may not be smoothly charged in the hydrogen tank at a temperature higher than the predetermined range of the highest temperature, it is difficult to sufficiently secure the state of charge of hydrogen even when the hydrogen is charged to the hydrogen tank up to the maximum pressure. If the state of charge of hydrogen of the hydrogen tank is insufficient based on the same pressure in the hydrogen tank, a distance to empty of the vehicle is significantly decreased.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a device configured for controlling a charging of a hydrogen tank for a vehicle, which may efficiently perform a charging of a hydrogen tank regardless of a hydrogen charging protocol for each charging station that supplies hydrogen to the hydrogen tank by directly controlling a hydrogen charging speed of the hydrogen tank in a vehicle when charging the hydrogen tank which is mounted in the vehicle.

Therefore, various aspects of the present invention provide a device configured for controlling a charging of a hydrogen tank for a vehicle including a hydrogen tank configured to receive and store hydrogen from a hydrogen supply device connected to the hydrogen tank; a flow volume adjustment valve mounted and provided on an inlet of the hydrogen tank, and configured to adjust a real-time hydrogen charging speed of the hydrogen tank depending upon an opening amount thereof; and a charging control unit electrically connected to the flow volume adjustment valve and provided in a vehicle mounted with the hydrogen tank, and configured to determine a target hydrogen charging speed of the hydrogen tank according to an external air temperature and a temperature and a pressure of the hydrogen tank and determine and control the opening amount of the flow volume adjustment valve according to the target hydrogen charging speed and the real-time hydrogen charging speed of the hydrogen tank.

According to various exemplary embodiments of the present invention, the charging control unit is configured to decrease the real-time opening amount of the flow volume adjustment valve when the charging control unit concludes that the real-time hydrogen charging speed is greater than the target hydrogen charging speed. The charging control unit is configured to decrease the real-time opening amount of the flow volume adjustment valve according to a ratio of the target hydrogen charging speed and the real-time hydrogen charging speed when the charging control unit concludes that the real-time hydrogen charging speed is greater than the target hydrogen charging speed.

Furthermore, the charging control unit is configured to increase the real-time opening amount of the flow volume adjustment valve when the charging control unit concludes that the real-time hydrogen charging speed is smaller than the target hydrogen charging speed.

Furthermore, the charging control unit is configured to maintain the real-time opening amount of the flow volume adjustment valve when the charging control unit concludes that the real-time hydrogen charging speed is equal to the target hydrogen charging speed.

Furthermore, the real-time hydrogen charging speed is determined as a change rate in a state of charge of the hydrogen charged in the hydrogen tank, and the state of charge of the hydrogen is determined based on the temperature and the pressure of the hydrogen tank.

Furthermore, the charging control unit is configured to determine the target hydrogen charging speed at a predetermined cycle, determines the real-time hydrogen charging speed of the hydrogen tank, and determines and controls the opening amount of the flow volume adjustment valve according to the determined target hydrogen charging speed and the determined real-time hydrogen charging speed per the predetermined cycle.

Furthermore, the charging control unit is configured to conclude that a hydrogen supply speed of the hydrogen supply device decreases when the real-time opening amount of the flow volume adjustment valve continuously increases by a predetermined accumulated number of times and increases the real-time opening amount of the flow volume adjustment valve as much as possible.

According to the above configuration, various aspects of the present invention provide the following main effects.

First, it is possible to efficiently and stably charge the hydrogen regardless of different hydrogen supply methods for each hydrogen supply device by directly controlling the hydrogen charging speed at which the hydrogen is charged in the hydrogen tank by adjusting the opening amount of the flow volume adjustment valve mounted on the inlet of the hydrogen tank.

Second, it is possible to secure the sufficient state of charge of hydrogen while minimizing the charging time of the hydrogen tank by determining the opening amount of the flow volume adjustment valve based on the optimal target hydrogen charging speed and the real-time hydrogen charging speed according to the real-time charging situation of the hydrogen tank.

Third, it is possible to compensate for the state of charge of hydrogen for the time during which the charging of the hydrogen tank is interrupted and to minimize the extension of the charging time of the hydrogen tank by predicting the time when the hydrogen supply of the hydrogen supply device is to be interrupted to increase the real-time hydrogen charging speed of the hydrogen tank as much as possible.

Fourth, it is possible to efficiently control the hydrogen charging of the hydrogen tank directly in the vehicle without additional costs when only the state-of-charge determination model and charging speed determination model of the charging control unit are changed in case of changing the type of hydrogen tank.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels determined from resources other than petroleum). As referred to herein, a hybrid automotive is an automotive that has two or more sources of power, for example both gasoline-powered and electric-powered automotives.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
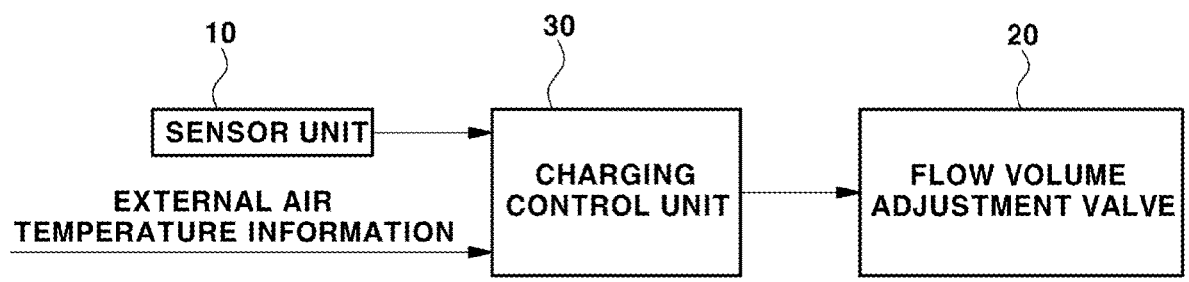
FIG. 1 is a diagram illustrating a configuration of a device configured for controlling a charging of a hydrogen tank for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment of the present invention will be described with reference to the accompanying drawings. The contents illustrated in the accompanying drawings are schematized to easily explain the exemplary embodiment of the present invention and may be different from the form actually implemented.

Throughout the specification, when a certain portion "comprises" a certain component, it means that other components may be further included, rather than excluding other components, unless otherwise stated especially.

As illustrated in FIG. 1, a device configured for controlling a charging of a hydrogen tank for a vehicle according to various exemplary embodiments of the present invention includes a sensor unit 10 configured to detect state information of a hydrogen tank mounted on a vehicle, a flow volume adjustment valve 20 configured to adjust a flow volume (g/s) of hydrogen charged in the hydrogen tank, and a charging control unit 30 configured to determine and control an opening amount of the flow volume adjustment valve 20.

Figure 2:
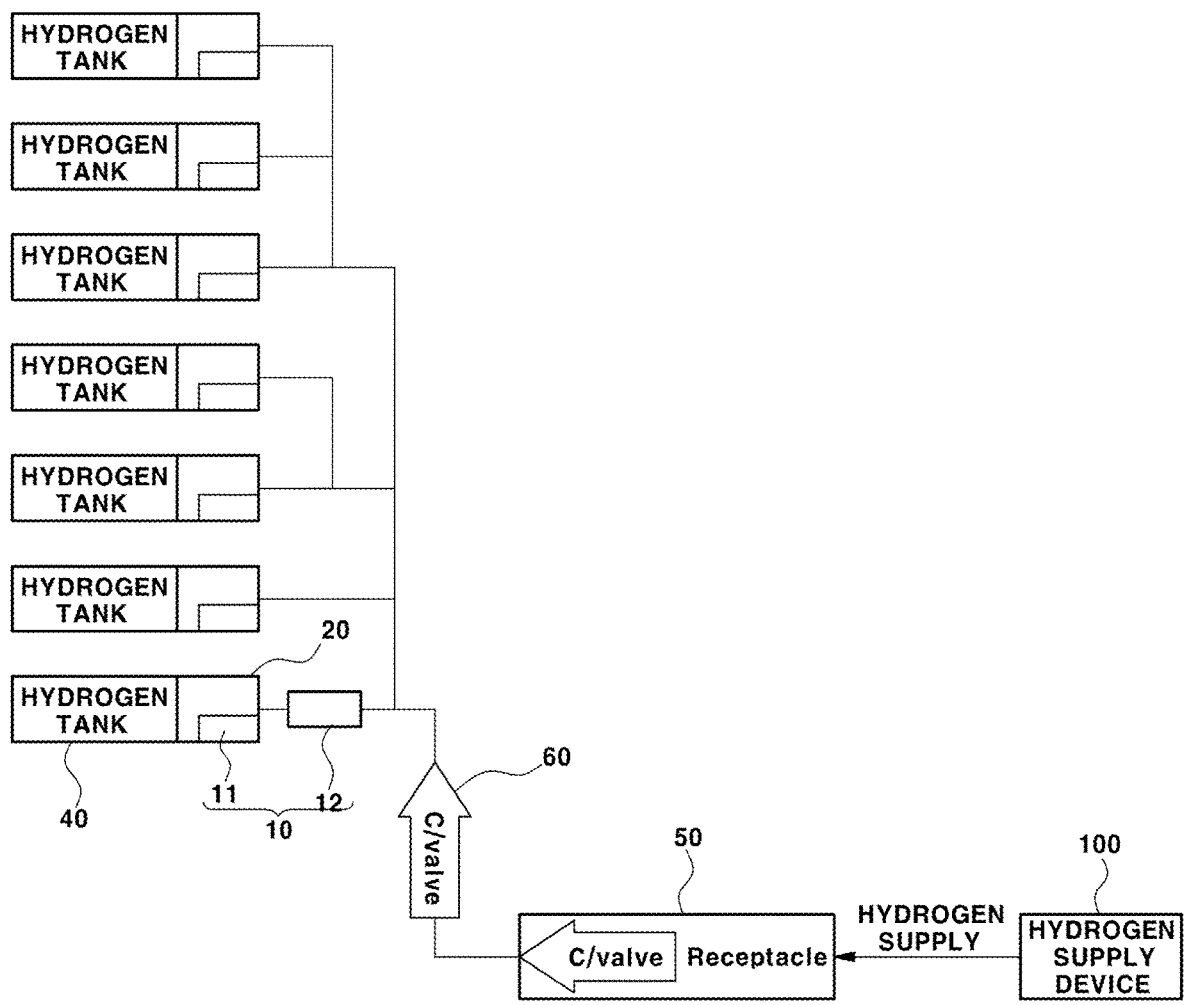
FIG. 2 is a diagram partially illustrating a hydrogen non-transitory storage system for a general vehicle.

Referring to FIG. 2, a plurality of hydrogen tanks 40 is mounted in the vehicle, and the flow volume adjustment valve 20 is provided on an inlet of each hydrogen tank 40. The flow volume adjustment valve 20 is configured to adjust a flow volume of hydrogen charged in the hydrogen tank 40, and an electronic valve, such as a solenoid valve, may be applied.

The flow volume adjustment valve 20 may open or close an internal flow path depending upon an amount of current applied to the flow volume adjustment valve 20 to control the flow volume of the hydrogen. As the current applied to the flow volume adjustment valve 20 increases, the opening amount of the flow volume adjustment valve 20 decreases.

Furthermore, as the opening amount of the flow volume adjustment valve 20 decreases, a state of charge (SOC) value of hydrogen per unit time (g/s) which is filled in the hydrogen tank 40 through the flow volume adjustment valve 20 decreases, and as the opening amount of the flow volume adjustment valve 20 increases, the state of charge of hydrogen per unit time which is filled in the hydrogen tank 40 through the flow volume adjustment valve 20 increases.

Here, the hydrogen charging speed of the hydrogen tank 40 is a speed at which hydrogen is filled in the hydrogen tank 40. In other words, the hydrogen charging speed of the hydrogen tank 40 is the state of charge of hydrogen per unit time (g/s) which is filled in the hydrogen tank 40.

The sensor unit 10 includes a temperature sensor configured to detect a temperature of the hydrogen tank 40 and a pressure sensor configured to detect a pressure of the hydrogen tank 40.

It is impossible to directly detect the internal temperature and internal pressure of the hydrogen tank 40. In other words, it is impossible to directly detect the temperature and the pressure of the hydrogen stored in the hydrogen tank 40.

Referring to FIG. 2, a temperature sensor 11 of the sensor unit 10 is mounted on one side of the flow volume adjustment valve 20 to detect the temperature of the hydrogen tank 40, and a pressure sensor 12 of the sensor unit 10 is mounted on a hydrogen movement line connected to the flow volume adjustment valve 20 to detect the pressure of the hydrogen tank 40. The charging control unit 30 recognizes the temperature information and pressure information of the hydrogen tank 40 received from the sensor unit 10 as the internal temperature and internal pressure of the hydrogen tank 40.

The flow volume adjustment valve 20 opens the inlet of the hydrogen tank 40 even when supplying the hydrogen stored in the hydrogen tank 40 to a power module complete using hydrogen in the vehicle as well as opening the inlet of the hydrogen tank 40 when the hydrogen is charged in the hydrogen tank 40. As the power module complete, there is, for example, a fuel cell stack.

Referring to FIG. 2, the hydrogen supplied to the hydrogen tank 40 by a hydrogen supply device 100 may be charged in the hydrogen tank 40 through a receptacle 50, a check valve 60, and the flow volume adjustment valve 20. A hydrogen supply speed at which the hydrogen supply device 100 supplies the hydrogen to the hydrogen tank 40 may be determined depending upon a hydrogen supply control method of the hydrogen supply device 100.

Here, the hydrogen supply device 100 may include a fixed hydrogen charger provided in a charging station to supply the hydrogen to the hydrogen tank 40. Furthermore, hydrogen supply device 100 may also include a movable hydrogen charger. Furthermore, the hydrogen vehicle connected to the hydrogen tank 40 such that the hydrogen is supplied to supply the hydrogen to the hydrogen tank 40 may also be included in the hydrogen supply device 100.

The charging control unit 30 may receive external air temperature information from an external air information provision unit provided in the vehicle in real time. The external air information provision unit may deliver the external air temperature information to the charging control unit 30 through a wired communication for the vehicle. For example, the external air information provision unit may be an external air temperature sensor provided in the vehicle.

The number of hydrogen tanks 40 mounted in the vehicle may be changed depending upon the type of the vehicle, and a hydrogen storage system for the vehicle is provided with the hydrogen tank 40, the sensor unit 10, and the flow volume adjustment valve 20 as the basic configuration. The charging control unit 30 may be a hydrogen storage management unit (HMU) provided in the hydrogen storage system.

The sensor unit 10 is individually mounted and provided for each hydrogen tank 40 mounted in the vehicle, and each sensor unit 10 delivers the detected information to the charging control unit 30. The temperature information and pressure information of the hydrogen tank 40 detected by the sensor unit 10 in real time are delivered to the charging control unit 30.

The charging control unit 30 directly controls the hydrogen charging speed of the hydrogen tank 40 without communication with the hydrogen supply device 100. The charging control unit 30 may control the driving of the flow volume adjustment valve 20 mounted on the inlet of the hydrogen tank 40 to adjust the flow volume of the hydrogen (i.e., hydrogen charging speed) charged in the hydrogen tank 40.

The charging control unit 30 may directly control the hydrogen charging speed of the hydrogen tank 40 through the driving control of the flow volume adjustment valve 20 to efficiently and stably charge the hydrogen tank 40 even when the hydrogen supply speed at which the hydrogen supply device 100 supplied the hydrogen and the hydrogen charging speed of the hydrogen tank 40 in the vehicle are different.

The charging control unit 30 may control the hydrogen charging of the hydrogen tank 40 at a speed which is most suitable for a condition of the hydrogen tank 40 regardless of a self-charging method of the hydrogen supply device 100.

The charging control unit 30 determines a target hydrogen charging speed (g/s) of the hydrogen tank 40 using a previously constructed charging speed determination model, and determines and controls an opening amount of the flow volume adjustment valve 20 based on the determined target hydrogen charging speed. The charging control unit 30 determines and controls an amount of current applied to the flow volume adjustment valve 20 based on the target hydrogen charging speed to control the opening amount of the flow volume adjustment valve 20. The target hydrogen charging speed refers to an optimal charging speed of the hydrogen charged in the hydrogen tank 40.

The charging speed determination model may be configured to determine the target hydrogen charging speed (g/s) of the hydrogen tank 40 based on the temperature and the pressure of the hydrogen tank 40 and an external air temperature detected in real time, and provided to be stored in the charging control unit 30.

The charging speed determination model determines the target hydrogen charging speed to satisfy conditions where the charging time is minimized and the temperature of the hydrogen tank 40 is the highest limit temperature or less while achieving a target amount of hydrogen to be charged in the hydrogen tank 40. The highest limit temperature refers to a predetermined temperature range of the highest temperature to secure the durability, state of charge of hydrogen, etc. of the hydrogen tank 40.

Furthermore, since the charging of hydrogen at a uniform speed is advantageous for cooling the hydrogen tank 40 according to the thermal exchange with the external air, the charging speed determination model is constructed on the assumption that the hydrogen is charged at the uniform speed for the charging time.

For example, when the hydrogen tank 40 is charged at a charging speed lower than the target hydrogen charging speed, the charging time may be excessively consumed, and when it is charged at a charging speed higher than the target hydrogen charging speed, it is difficult to achieve the target amount of hydrogen to be charged in the hydrogen tank 40 because it is impossible to sufficiently charge the hydrogen.

Furthermore, when the hydrogen tank 40 is connected to the hydrogen supply device 100 through the receptacle 50 for the vehicle and the hydrogen charging of the hydrogen tank 40 starts, the charging control unit 30 predicts and determines a real-time hydrogen charging speed of the hydrogen tank 40. The real-time hydrogen charging speed may be determined as a change rate in the state of charge of the hydrogen charged in the hydrogen tank 40. The change rate in the state of charge of hydrogen may be determined based on an initial state of charge of the hydrogen tank 40. The initial state of charge is a remaining amount of hydrogen stored in the hydrogen tank 40 just before the hydrogen charging of the hydrogen tank 40 starts.

The charging control unit 30 may determine a real-time state of charge of hydrogen using the previously constructed state-of-charge determination model. The state-of-charge determination model may be configured to determine the real-time state of charge of the hydrogen charged in the hydrogen tank 40 based on the temperature and the pressure information of the hydrogen tank 40 detected in real time, and provided to be stored in the charging control unit 30.

The charging control unit 30 may compare the real-time hydrogen charging speed and target hydrogen charging speed of the hydrogen tank 40, and determine and control the opening amount of the flow volume adjustment valve 20 depending upon the comparison result thereof. In other words, the charging control unit 30 may change and adjust the opening amount of the flow volume adjustment valve 20 based on the real-time hydrogen charging speed and the target hydrogen charging speed. The charging control unit 30 compares the real-time hydrogen charging speed and target hydrogen charging speed of the hydrogen tank 40 every predetermined control cycle ($t_c$), and adjusts the opening amount of the flow volume adjustment valve 20 depending upon the comparison result thereof.

If the hydrogen tank 40 is first charged, that is, when the charging of the hydrogen tank 40 starts, the charging control unit 30 fully opens the flow volume adjustment valve 20. At the instant time, when the hydrogen tank 40 is in a chargeable state, the charging control unit 30 increases a real-time opening amount of the flow volume adjustment valve 20 up to 100% regardless of the real-time hydrogen charging speed and target hydrogen charging speed of the hydrogen tank 40 to fully open the flow volume adjustment valve 20. The charging control unit 30 may determine whether the hydrogen tank 40 is in the chargeable state based on detection information of the sensor unit 10. For example, the charging control unit 30 may determine whether the hydrogen tank 40 is in the chargeable state based on the temperature and the pressure information of the hydrogen tank 40.

Furthermore, the charging control unit 30 decreases the real-time opening amount of the flow volume adjustment valve 20 when the real-time hydrogen charging speed of the hydrogen tank 40 is greater than the target hydrogen charging speed. The charging control unit 30 may decrease the opening amount of the flow volume adjustment valve 20 in real time depending upon a ratio of the target hydrogen charging speed and the real-time hydrogen charging speed. The ratio of the target hydrogen charging speed and the real-time hydrogen charging speed is determined by a value obtained by dividing the target hydrogen charging speed by the real-time hydrogen charging speed.

Since a flow rate of the hydrogen passing through the flow volume adjustment valve 20 is maintained at a constant value (i.e., constant), the real-time hydrogen charging speed decreases as an amount of hydrogen filled in the hydrogen tank 40 relatively decreases when the opening amount of the flow volume adjustment valve 20 decreases.

Therefore, when the real-time opening amount of the flow volume adjustment valve 20 decreases based on the ratio of the target hydrogen charging speed and the real-time hydrogen charging speed, the real-time hydrogen charging speed reaches the target hydrogen charging speed.

Furthermore, if the real-time hydrogen charging speed is smaller than the target hydrogen charging speed, the charging control unit 30 increases the real-time opening amount of the flow volume adjustment valve 20. Even in the instant case, the real-time opening amount of the flow volume adjustment valve 20 may be increased based on the ratio of the target hydrogen charging speed and the real-time hydrogen charging speed. Furthermore, the charging control unit 30 maintains the real-time opening amount of the flow volume adjustment valve 20 when the charging control unit 30 concludes that the real-time hydrogen charging speed is equal to the target hydrogen charging speed.

If the hydrogen is charged in the hydrogen tank 40 using the hydrogen supply device 100, the target hydrogen charging speed decreases and the hydrogen supply speed of the hydrogen supply device 100 increases while the temperature of the hydrogen tank 40 increases as the hydrogen tank 40 is charged. For example, as the hydrogen tank 40 is charged, the charging station supplies the hydrogen in a method for increasing the hydrogen supply speed of the hydrogen charger.

Therefore, the charging control unit 30 determines the target hydrogen charging speed of the hydrogen tank 40 every predetermined control cycle ($t_c$) and determines the real-time hydrogen charging speed of the hydrogen tank 40. Furthermore, the charging control unit 30 determines and controls the real-time opening amount of the flow volume adjustment valve 20 based on the determined target hydrogen charging speed and the determined real-time hydrogen charging speed every control cycle ($t_c$). At the instant time, the charging control unit 30 may change the real-time opening amount of the flow volume adjustment valve 20 based on the ratio of the target hydrogen charging speed and the real-time hydrogen charging speed. For example, the control cycle ($t_c$) may be set as 1 to 3 seconds.

The hydrogen supply speed of the hydrogen supply device 100 is changed depending upon the conditions of the temperature, pressure, etc. of the hydrogen supplied to the hydrogen tank 40 for the vehicle. When the hydrogen supply speed of the hydrogen supply device 100 is greater than the real-time hydrogen charging speed of the hydrogen tank 40, a hydrogen pressure of the hydrogen supply device 100 side increases. In the instant case, the hydrogen supply device 100 itself performs a hydrogen pressure control to adjust the hydrogen pressure. For example, if the real-time hydrogen charging speed of the hydrogen tank 40 decreases, that is, if the opening amount of the flow volume adjustment valve 20 decreases, the hydrogen supply device 100 may decrease a driving speed of a hydrogen compressor to decrease the hydrogen pressure.

However, if the charging control unit 30 for the vehicle directly controls the hydrogen charging speed of the hydrogen tank 40 without communication with the hydrogen supply device 100, only a small flow volume of hydrogen supplied by the hydrogen supply device 100 should be manually charged when the hydrogen supply speed of the hydrogen supply device 100 is smaller than the real-time hydrogen charging speed of the hydrogen tank 40. Therefore, there may occur problems of not sufficiently performing the hydrogen charging of the hydrogen tank 40 and increasing the charging time.

Figure 3:
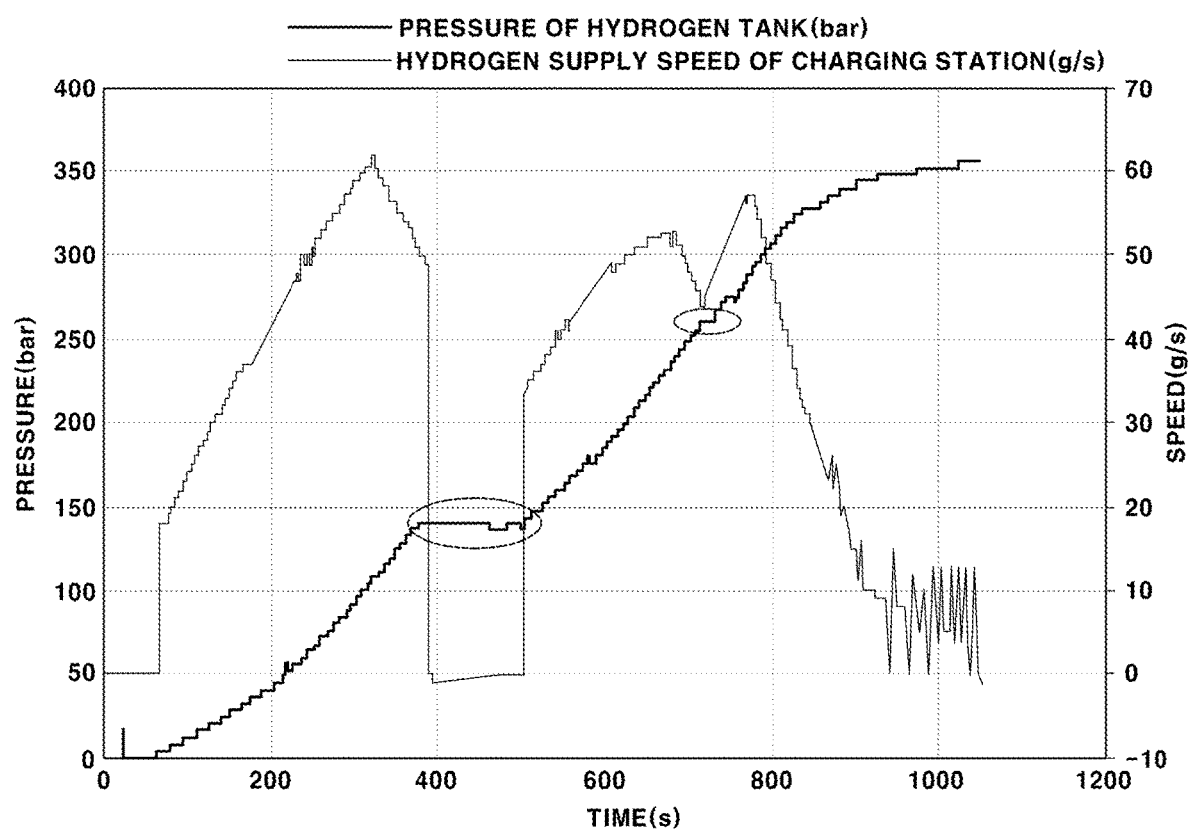
FIG. 3 is an exemplary diagram illustrating a change in pressure of a hydrogen tank for a vehicle according to a hydrogen supply speed for a conventional hydrogen supply device.

FIG. 3 illustrates the result of measuring a change in pressure (bar) of the hydrogen tank for the vehicle according to the hydrogen supply speed (g/s) of the hydrogen charger of the charging station.

Referring to FIG. 3, the pressure of the hydrogen tank for the vehicle is temporarily maintained or decreased when a predetermined time period elapses from the time when the pressure (bar) of the hydrogen tank for the vehicle increases, and then the hydrogen supply speed of the hydrogen charger of the charging station starts to decrease if the hydrogen supply speed (g/s) of the hydrogen charger of the charging station increases.

Generally, as the hydrogen charging of the hydrogen tank is performed, the pressure of the hydrogen tank gradually increases. The state where the pressure of the hydrogen tank does not increase and is maintained or decreased means that the hydrogen charging of the hydrogen tank will be interrupted.

Therefore, the decrease in the hydrogen supply speed of the hydrogen charger of the charging station, that is, the decrease in the hydrogen supply speed of the hydrogen supply device 100 means that the hydrogen supply of the hydrogen supply device 100 will be interrupted sooner or later.

For example, the hydrogen supply device 100 interrupts the hydrogen supply during a predetermined time period when the temperature of the supply hydrogen reaches a predetermined temperature while the hydrogen is supplied to the hydrogen tank 40.

To respond to the problem in that the hydrogen supply of the hydrogen supply device 100 is interrupted, when it is determined that the hydrogen supply speed of the hydrogen supply device 100 decreases, the charging control unit 30 for the vehicle increases the opening amount of the flow volume adjustment valve 20 up to 100% (i.e., as much as possible) to increase the real-time hydrogen charging speed of the hydrogen tank 40 and to secure the state of charge of the hydrogen charged in the hydrogen tank 40 in advance.

In other words, when it is determined that the hydrogen supply speed of the hydrogen supply device 100 decreases, the charging control unit 30 predicts and responds that the hydrogen supply of the hydrogen supply device 100 will be interrupted sooner or later to increase the opening amount of the flow volume adjustment valve 20 as much as possible.

In other words, when it is determined that the hydrogen supply speed of the hydrogen supply device 100 decreases, the charging control unit 30 may fully open the flow volume adjustment valve 20 to further secure the state of charge of hydrogen of the hydrogen tank 40 before the hydrogen supply of the hydrogen supply device 100 is interrupted.

It is possible to minimize the shortage of the state of charge of hydrogen of the hydrogen tank 40 and the extension of the charging time according to the interruption of the hydrogen supply of the hydrogen supply device 100 by further securing the state of charge of hydrogen of the hydrogen tank 40 before the hydrogen supply of the hydrogen supply device 100 is interrupted.

If the flow volume adjustment valve 20 is fully opened, the temperature of the hydrogen tank 40 may be excessively increased by the increase in the hydrogen charging speed of the hydrogen tank 40, but the temperature of the hydrogen tank 40 may be stabilized through the cooling by the external air while the hydrogen supply of the hydrogen supply device 100 is interrupted. Furthermore, a hydrogen supply interruption time of the hydrogen supply device 100 may also increase as a hydrogen supply speed decrease time of the hydrogen supply device 100 increases, preventing an overheating problem of the hydrogen tank 40.

The charging control unit 30 determines and controls the real-time opening amount of the flow volume adjustment valve 20 depending upon the comparison result of the real-time hydrogen charging speed and the target hydrogen charging speed, and then monitors whether the opening amount of the flow volume adjustment valve 20 continuously increases to determine whether the hydrogen supply speed of the hydrogen supply device 100 decreases. If the hydrogen tank 40 is normally charged, the real-time opening amount of the flow volume adjustment valve 20 is decreased or maintained as the charging is performed.

However, when the hydrogen supply speed of the hydrogen supply device 100 decreases while the hydrogen tank 40 is charged, the real-time hydrogen charging speed of the hydrogen tank 40 is decreased to a value smaller than the target hydrogen charging speed.

The charging control unit 30 increases the real-time opening amount of the flow volume adjustment valve 20 when the real-time hydrogen charging speed of the hydrogen tank 40 is smaller than the target hydrogen charging speed, and determines that the hydrogen supply speed of the hydrogen supply device 100 decreases when the real-time opening amount of the flow volume adjustment valve 20 continuously increases and therefore, increases the real-time opening amount of the flow volume adjustment valve 20 as much as possible. At the instant time, it is possible to increase the real-time opening amount of the flow volume adjustment valve 20 as much as possible, securing the state of charge of hydrogen of the hydrogen tank 40 and preventing the charging time of the hydrogen tank 40 from extending.

In other words, the charging control unit 30 determines that the hydrogen supply speed of the hydrogen supply device 100 decreases when the real-time opening amount of the flow volume adjustment valve 20 continuously increases.

Furthermore, the charging control unit 30 determines that the hydrogen supply speed of the hydrogen supply device 100 does not decrease when the real-time opening amount of the flow volume adjustment valve 20 does not continuously increase but non-continuously increases.

According to various exemplary embodiments of the present invention, when it is determined that the hydrogen supply speed of the hydrogen supply device 100 decreases while the hydrogen charging of the hydrogen tank 40 is performed, it is possible to control the real-time opening amount of the flow volume adjustment valve 20 as much as possible, sufficiently securing the state of charge of hydrogen of the hydrogen tank 40.

Figure 4:
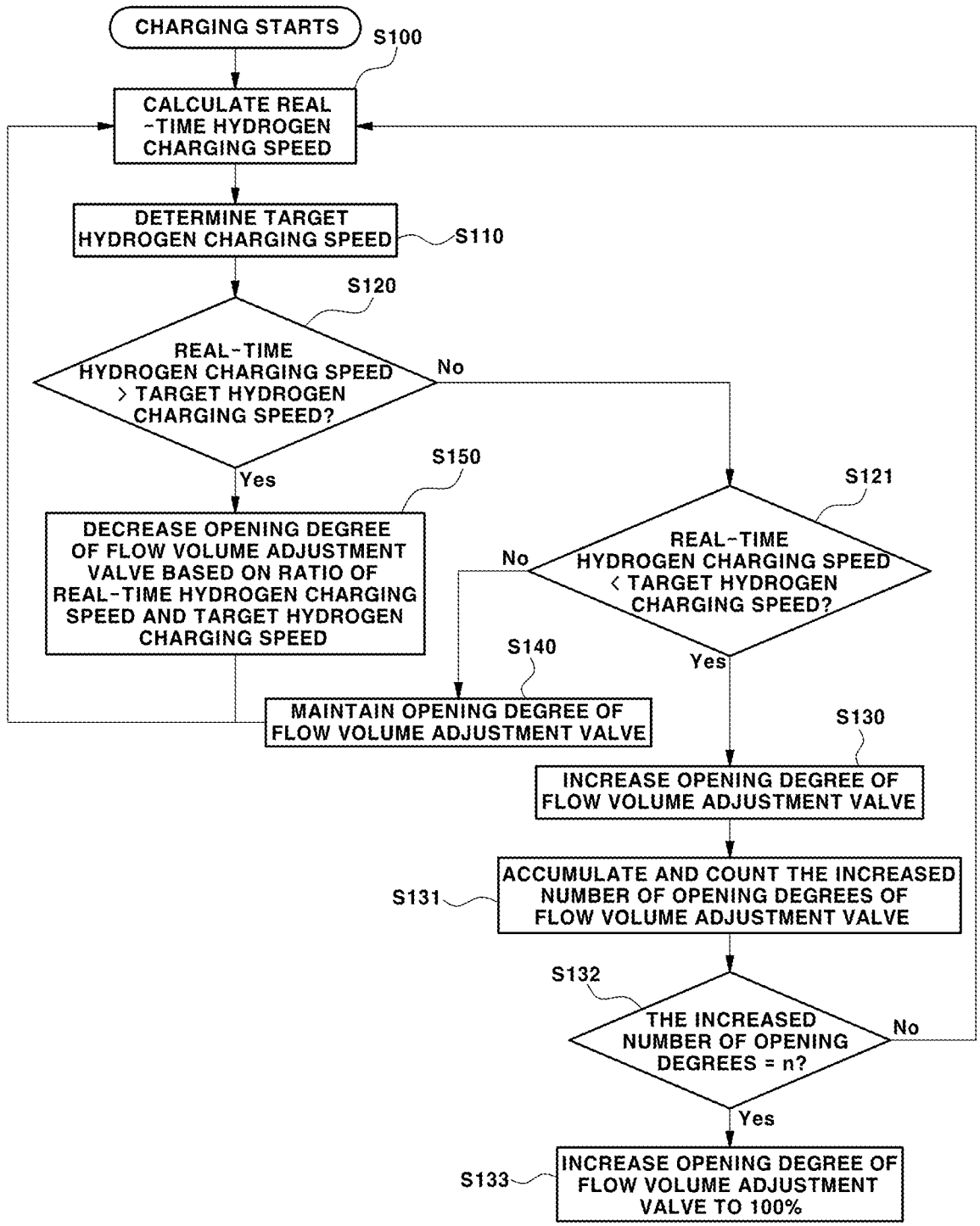
FIG. 4 is a flowchart illustrating a method for controlling a charging of a hydrogen tank for a vehicle according to various exemplary embodiments of the present invention.

Here, a process of controlling the hydrogen charging of the hydrogen tank will be described with reference to FIG. 4. FIG. 4 is a diagram illustrating a method for controlling the charging of the hydrogen tank according to various exemplary embodiments of the present invention.

As illustrated in FIG. 4, the charging control unit 30 fully opens the flow volume adjustment valve 20 when the hydrogen charging of the hydrogen tank 40 starts and then determines the real-time hydrogen charging speed (S100). The charging control unit 30 determines the state of charge of the hydrogen charged in the hydrogen tank 40 in real time based on the temperature and the pressure of the hydrogen tank 40 through the state-of-charge determination model and determines the real-time hydrogen charging speed based on the change rate in the state of charge of hydrogen.

The charging control unit 30 may determine that the hydrogen charging of the hydrogen tank 40 has started when sensing that the hydrogen supply device 100 is connected to the charging receptacle 50 of the hydrogen tank 40.

The charging control unit 30 fully opens the flow volume adjustment valve 20 when sensing that the hydrogen supply device 100 is connected to the receptacle 50. In other words, the charging control unit 30 determines and controls the real-time opening amount of the flow volume adjustment valve 20 as 100% at the time when the charging of the hydrogen tank 40 starts.

The charging control unit 30 determines the real-time hydrogen charging speed of the hydrogen tank 40 and then determines the target hydrogen charging speed (S110). The charging control unit 30 determines the target hydrogen charging speed based on the temperature and the pressure of the hydrogen tank 40 and the external air temperature through the charging speed determination model. At the instant time, the target hydrogen charging speed is determined based on the same temperature and pressure information as those when the real-time hydrogen charging speed is determined.

Accordingly, the charging control unit 30 compares the real-time hydrogen charging speed with the target hydrogen charging speed (S120, S121), increases the opening amount of the flow volume adjustment valve 20 when the real-time hydrogen charging speed is smaller than the target hydrogen charging speed as a comparison result (S130), and maintains the real-time opening amount of the flow volume adjustment valve 20 as it is when the real-time hydrogen charging speed is equal to the target hydrogen charging speed (S140).

At the present time, the charging control unit 30 increases the opening amount of the flow volume adjustment valve 20 based on the ratio of the target hydrogen charging speed and the real-time hydrogen charging speed. Here, the charging control unit 30 may also increase the real-time opening amount of the flow volume adjustment valve 20 based on the difference value between the target hydrogen charging speed and the real-time hydrogen charging speed.

Furthermore, the charging control unit 30 compares the real-time hydrogen charging speed with the target hydrogen charging speed (S120) and decreases the opening amount of the flow volume adjustment valve 20 based on the ratio of the real-time hydrogen charging speed and the target hydrogen charging speed when it is determined that the real-time hydrogen charging speed is greater than the target hydrogen charging speed as a comparison result (S150).

Furthermore, the charging control unit 30 increases the real-time opening amount of the flow volume adjustment valve 20 in step S130, then determines the real-time hydrogen charging speed of the hydrogen tank 40 again when the predetermined control cycle ($t_c$) arrives (S100), and determines the target hydrogen charging speed of the hydrogen tank 40 (S110). In other words, the charging control unit 30 determines the real-time hydrogen charging speed every control cycle ($t_c$) and determines the target hydrogen charging speed.

The charging control unit 30 compares the determined real-time hydrogen charging speed with the determined target hydrogen charging speed (S120, S121) and increases the opening amount of the flow volume adjustment valve 20 again when the real-time hydrogen charging speed is smaller than the target hydrogen charging speed as a comparison result (S130). In other words, the charging control unit 30 increases the real-time opening amount of the flow volume adjustment valve 20 one more time when the redetermined real-time hydrogen charging speed every control cycle ($t_c$) is still smaller than the redetermined target hydrogen charging speed.

The charging control unit 30 determines that the hydrogen supply speed of the hydrogen supply device 100 decreases if the real-time opening amount of the flow volume adjustment valve 20 is continuously increased during a predetermined setting time ($t_s$) and increases the real-time opening amount of the flow volume adjustment valve 20 as much as possible (S133).

The charging control unit 30 compares the target hydrogen charging speed with the real-time hydrogen charging speed (S120, S121), increases the opening amount of the flow volume adjustment valve 20 when the real-time hydrogen charging speed is smaller than the target hydrogen charging speed as a comparison result (S130), then accumulates and counts the increased number of opening amounts of the flow volume adjustment valve 20 (S131), and determines whether the increased number of opening amounts reaches the predetermined number of accumulations (n) (S132).

The charging control unit 30 maintains the real-time opening amount of the flow volume adjustment valve 20 in a state of being increased in step S130 when the increased number of opening amounts of the flow volume adjustment valve 20 does not reach the accumulated number of times (n).

Furthermore, the charging control unit 30 determines that the hydrogen supply speed of the hydrogen supply device 100 decreases when the increased number of opening amounts reaches the accumulated number of times (n) and increases the opening amount of the flow volume adjustment valve 20 as much as possible (S133). In other words, the charging control unit 30 fully opens the flow volume adjustment valve 20 when the real-time opening amount of the flow volume adjustment valve 20 continuously increases by the accumulated number of times (n).

For example, the charging control unit 30 may fully open the flow volume adjustment valve 20 when the real-time opening amount of the flow volume adjustment valve 20 continuously increases 3 times or more within the setting time ($t_s$). If the charging control unit 30 fully opens the flow volume adjustment valve 20, the real-time hydrogen charging speed of the hydrogen tank 40 may reach the target hydrogen charging speed in a relatively short time.

Here, the setting time ($t_s$) is determined as a predetermined plurality of the control cycle ($t_c$). The setting time ($t_s$) is determined as a value obtained by multiplying the control cycle ($t_c$) by the accumulated number of times (n), that is, a value of "the control cycle ($t_c$)×the accumulated number of times (n)." For example, the setting time ($t_s$) may be determined as a value of three times the control cycle ($t_c$).

As described above, the charging control unit 30 determines that the hydrogen supply speed of the hydrogen supply device 100 decreases when the real-time opening amount of the flow volume adjustment valve 20 continuously increases during the predetermined setting time ($t_s$) and fully opens the flow volume adjustment valve 20.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for controlling a charging of a hydrogen tank for a vehicle, the apparatus comprising:
   the hydrogen tank configured to receive and store hydrogen from a hydrogen supply device connected to the hydrogen tank;
   a flow volume adjustment valve mounted and provided on an inlet of the hydrogen tank, and configured to adjust a real-time hydrogen charging speed of the hydrogen tank depending upon an opening amount thereof; and
   a charging control unit electrically connected to the flow volume adjustment valve and provided in the vehicle mounted with the hydrogen tank, and configured to determine a target hydrogen charging speed of the hydrogen tank according to an external air temperature and a temperature and a pressure of the hydrogen tank and configured to determine and control the opening amount of the flow volume adjustment valve according to the target hydrogen charging speed and the real-time hydrogen charging speed of the hydrogen tank.

2. The apparatus of claim 1,
   wherein the charging control unit is configured to decrease a real-time opening amount of the flow volume adjustment valve when the charging control unit concludes that the real-time hydrogen charging speed is greater than the target hydrogen charging speed.

3. The apparatus of claim 1,
   wherein the charging control unit is configured to decrease a real-time opening amount of the flow volume adjustment valve according to a ratio of the target hydrogen charging speed and the real-time hydrogen charging speed when the charging control unit concludes that the real-time hydrogen charging speed is greater than the target hydrogen charging speed.

4. The apparatus of claim 1,
   wherein the charging control unit is configured to increase a real-time opening amount of the flow volume adjustment valve when the charging control unit concludes that the real-time hydrogen charging speed is smaller than the target hydrogen charging speed.

5. The apparatus of claim 4,
   wherein the real-time hydrogen charging speed is determined as a change rate in a state of charge of the hydrogen charged in the hydrogen tank, and the state of charge of the hydrogen is determined based on the temperature and the pressure of the hydrogen tank.

6. The apparatus of claim 1,
   wherein the charging control unit is configured to maintain a real-time opening amount of the flow volume adjustment valve when the charging control unit concludes that the real-time hydrogen charging speed is equal to the target hydrogen charging speed.

7. The apparatus of claim 1,
wherein the charging control unit is configured to determine the target hydrogen charging speed at a predetermined cycle, to determine the real-time hydrogen charging speed of the hydrogen tank, and to determine and control the opening amount of the flow volume adjustment valve according to the determined target hydrogen charging speed and the determined real-time hydrogen charging speed per the predetermined cycle.

8. The apparatus of claim 7,
wherein the charging control unit is configured to conclude that a hydrogen supply speed of the hydrogen supply device decreases when a real-time opening amount of the flow volume adjustment valve continuously increases by a predetermined accumulated number of times and is configured to increase the real-time opening amount of the flow volume adjustment valve.

9. The apparatus of claim 1,
wherein the charging control unit is configured to fully open the flow volume adjustment valve when the charging control unit concludes that the charging of the hydrogen tank starts.

10. The apparatus of claim 1,
wherein the hydrogen supply device is a hydrogen charger of a charging station.

11. A method for controlling a charging of a hydrogen tank for a vehicle, the method comprising:
determining, by a charging control unit electrically connected to a flow volume adjustment valve and provided in the vehicle mounted with the hydrogen tank, a target hydrogen charging speed of the hydrogen tank configured to receive and store hydrogen from a hydrogen supply device connected to the hydrogen tank, according to an external air temperature and a temperature and a pressure of the hydrogen tank; and
determining and controlling, by the charging control unit, an opening amount of the flow volume adjustment valve mounted and provided on an inlet of the hydrogen tank, and configured to adjust a real-time hydrogen charging speed of the hydrogen tank depending upon an opening amount thereof, according to the target hydrogen charging speed and the real-time hydrogen charging speed of the hydrogen tank.

12. The method of claim 11, further including:
decreasing, by the charging control unit, a real-time opening amount of the flow volume adjustment valve when the charging control unit concludes that the real-time hydrogen charging speed is greater than the target hydrogen charging speed.

13. The method of claim 11, further including:
decreasing, by the charging control unit, a real-time opening amount of the flow volume adjustment valve according to a ratio of the target hydrogen charging speed and the real-time hydrogen charging speed when the charging control unit concludes that the real-time hydrogen charging speed is greater than the target hydrogen charging speed.

14. The method of claim 11, further including:
increasing, by the charging control unit, a real-time opening amount of the flow volume adjustment valve when the charging control unit concludes that the real-time hydrogen charging speed is smaller than the target hydrogen charging speed.

15. The method of claim 14,
wherein the real-time hydrogen charging speed is determined as a change rate in a state of charge of the hydrogen charged in the hydrogen tank, and the state of charge of the hydrogen is determined based on the temperature and the pressure of the hydrogen tank.

16. The method of claim 11, further including:
maintaining, by the charging control unit, a real-time opening amount of the flow volume adjustment valve when the charging control unit concludes that the real-time hydrogen charging speed is equal to the target hydrogen charging speed.

17. The method of claim 11, further including:
determining, by the charging control unit, the target hydrogen charging speed at a predetermined cycle, to determine the real-time hydrogen charging speed of the hydrogen tank, and to determine and control the opening amount of the flow volume adjustment valve according to the determined target hydrogen charging speed and the determined real-time hydrogen charging speed per the predetermined cycle.

18. The method of claim 17,
wherein the charging control unit is configured to conclude that a hydrogen supply speed of the hydrogen supply device decreases when a real-time opening amount of the flow volume adjustment valve continuously increases by a predetermined accumulated number of times and is configured to increase the real-time opening amount of the flow volume adjustment valve.

19. The method of claim 11, further including:
fully opening, by the charging control unit, the flow volume adjustment valve when the charging control unit concludes that the charging of the hydrogen tank starts.

20. A non-transitory computer readable storage medium on which a program for performing the method of claim 11 is recorded.

* * * * *